No. 844,347. PATENTED FEB. 19, 1907.
W. F. GRELL.
WHEEL.
APPLICATION FILED JAN. 27, 1906.
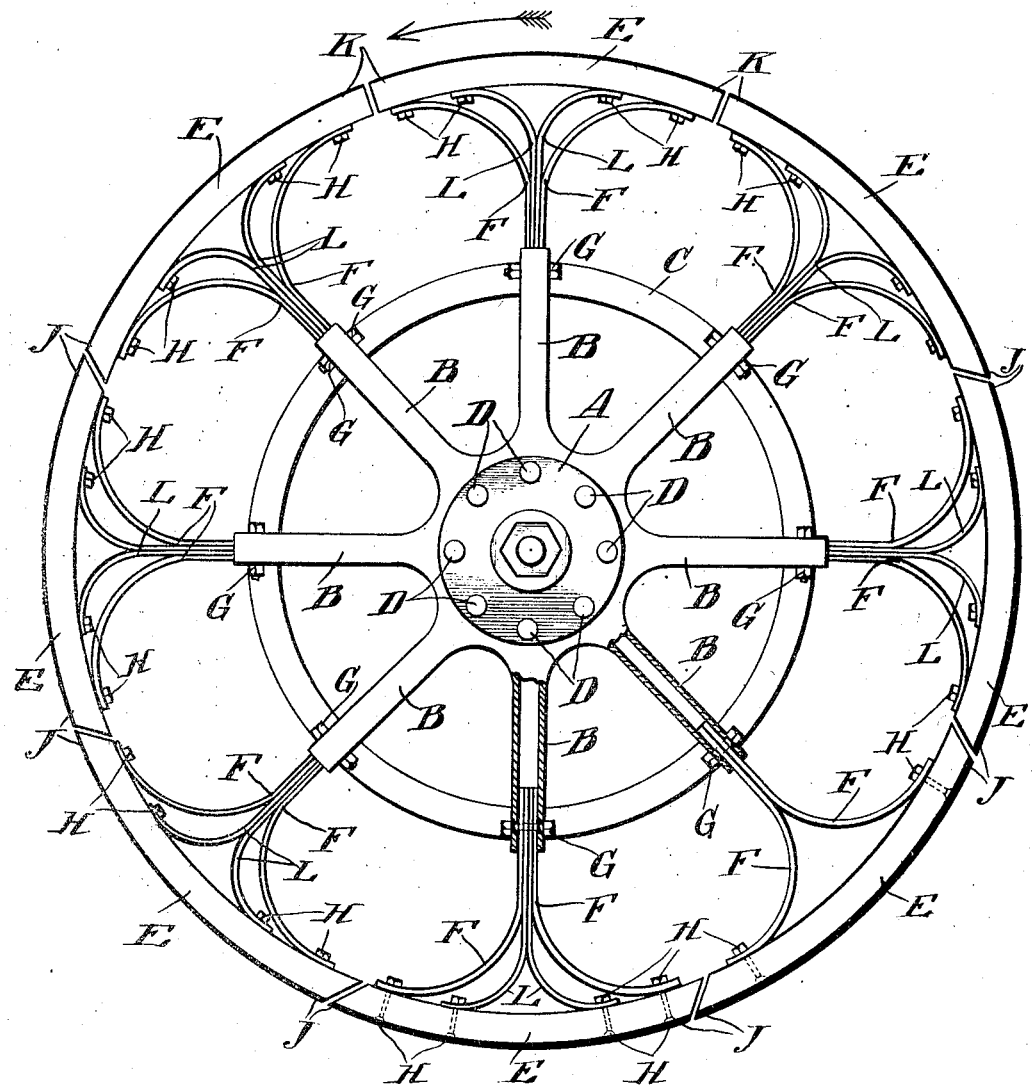
Attest:
Inventor:
William F. Grell
by Dickerson, Brown, Raegener & Binney
Attys

UNITED STATES PATENT OFFICE.

WILLIAM F. GRELL, OF NEW YORK, N. Y.

WHEEL.

No. 844,347.  Specification of Letters Patent.  Patented Feb. 19, 1907.

Application filed January 27, 1906. Serial No. 298,186.

*To all whom it may concern:*

Be it known that I, WILLIAM F. GRELL, a citizen of the United States, residing in New York, in the county of New York and State of New York, have invented certain new and useful Improvements in Wheels, of which the following is a specification accompanied by a drawing.

This invention relates to improvements in spring-wheels for vehicles; and the wheel is primarily designed to obviate the necessity of using pneumatic tires and the consequent delays and inconvenience caused by punctures and valve nuisances.

Further objects of the invention will hereinafter appear; and to these ends the invention consists of a spring-wheel for carrying out the above objects embodying the features of construction, combination of elements, and arrangement of parts having the general mode of operation substantially as hereinafter fully described and claimed in this specification and shown in the accompanying drawing, which is a side elevation of a wheel, partly in section.

The wheel is provided in this instance with hollow steel spokes B, attached to the hub A by means of the bolts D. The spokes B are preferably held rigid by the steel ring C, attached thereto.

The rim of the wheel is preferably divided into segments E—in this instance one for each spoke—and said segments are held in their respective positions, as shown, by the steel springs F and L, which are preferably flat and placed back to back and, as shown, inserted in the ends of the hollow spokes B. The springs F and L are preferably fastened to the spokes by bolts G passing through the spokes and the springs. The segments E are preferably fastened rigidly to the flat springs F and L—in this instance by the bolts H passing through the ends of the springs F and the segments E.

Any number of pairs of flat steel springs may be used, two pairs F and L being shown in all but one of the spokes. One spoke shows the use of only one pair of flat steel springs F. The curve of the springs can be varied to carry different weights and to give a greater or less amount of elasticity, as required.

The ends J of the sections E may be made to overlap each other, and in that case the wheel when loaded will rest upon one of the sections E, compressing the flat steel springs F and L, and as the wheel continues to turn in the direction of the arrow part of the strain will be transmitted to the section next in advance, and so on around. This will prevent any sudden strain suddenly being placed upon any one of the sections next in advance by gradually shifting the strain from one section to the other as the wheel turns, although under ordinary loads each section operates independent of any other section.

At the top of the wheel a modified section E is shown with the ends K cut on a radial line, and the whole wheel may be made this way. In that case each section is entirely independent of any other section, the springs F and L being compressed only when that section is actually resting upon the ground.

It will be seen that a wheel with the above improvements will provide a flexible spring surface which will reduce jar and wear to a minimum and also provide a running-surface that will greatly reduce the vibration in comparison with solid rubber or metal tires.

The material used, the weight of the parts, the number of spokes, and other details of construction may be varied according to the nature of the vehicle to which the wheel is to be applied.

A wheel constructed as above described has all the good points of a wheel whose rim is made in one piece and at the same time has all the advantages of a sectional rim. When the load is centered in the middle of a section, all the springs attached to that particular section are in compression; but as the load moves forward, the wheel turning in the direction of the arrow, the load is shifted to the end of the same section, thus placing the springs at that end in greater compression. This greater compression of the springs at that end is overcome by cutting the rim-section diagonally, as shown at J. It will be seen that the end of the section on being compressed comes in contact with the end of the other section next in advance. Both sections take an equal amount of strain when the center of the load is over the ends of the two sections. By cutting the end of the rim-sections in this manner no heavy jar or jolt will be placed upon any section as it first touches the ground, as the end of the section just leaving the ground pushes it up enough to let it readily replace the section leaving the ground.

The arrangement of the springs and the shape of the same as shown provides a most convenient method of holding the rim-section.

The pairs of springs diverging at the outer ends affords ample provision for attaching the springs to the rim-sections by means of bolts. Several pairs of springs may be used and fastened in this manner one pair inside the other, the number of pairs depending upon the length of the rim-sections. All of the springs from any one section are made to converge toward the center of the wheel, the inner ends of the springs being fastened to the outer end of one of the spokes.

If a hollow spoke is used, all of the inner ends of the springs can be held rigidly by means of one bolt. In case a solid spoke is used the springs may be fastened in pairs along the length of the spoke.

What I claim as my invention, and desire to secure by Letters Patent, is—

1. In a spring-wheel for a vehicle, the combination of a hub, a number of spokes radiating from the hub, a sectional rim, one section for each spoke, flexible spring-spokes placed back to back in pairs, the inner ends attached to the end of each spoke, the outer ends being bent and attached to each end of the rim-sections.

2. In a spring-wheel for a vehicle, the combination of a hub, a number of spokes radiating from the hub, a sectional rim, one section for each spoke, a number of flexible spring-spokes placed back to back in pairs, the inner ends attached to the end of each spoke, the outer ends being bent and attached to each end of the rim-sections, the ends of said rim-sections being formed so as to overlap one another.

3. In a spring-wheel for a vehicle, the combination of a hub, a number of spokes radiating from the hub, a sectional rim, one section for each spoke, a number of flexible spring-spokes placed back to back in pairs, means for attaching the inner ends of the springs to the spokes, and means for attaching the bent outer ends of the springs to the ends of the rim-sections, said ends being formed to partially shift the load on the next preceding rim-section.

4. In a spring-wheel for a vehicle, the combination of a hub, a number of spokes radiating from the hub, a sectional rim, one section for each spoke, a number of flexible spring-spokes placed back to back in pairs, bolts for attaching the inner ends of the springs to the spokes, and bolts for attaching the bent outer ends of the springs to the ends of the rim-sections.

In testimony whereof I have signed this specification in the presence of two subscribing witnesses.

WILLIAM F. GRELL.

Witnesses:
OLIN A. FOSTER,
LEO J. MATTY.